(No Model.)

C. BOSEKER.
Combined Hub Band and Protector.

No. 243,494. Patented June 28, 1881.

Witnesses.

Inventor.
Christian Boseker.
By James L. Norris
Atty.

UNITED STATES PATENT OFFICE.

CHRISTIAN BOSEKER, OF FORT WAYNE, INDIANA.

COMBINED HUB BAND AND PROTECTOR.

SPECIFICATION forming part of Letters Patent No. 243,494, dated June 28, 1881.

Application filed April 19, 1881. (No model.)

*To all whom it may concern:*

Be it known that I, CHRISTIAN BOSEKER, a citizen of the United States, residing at Fort Wayne, in the county of Allen and State of Indiana, have invented new and useful Improvements in Combined Hub Band and Protector, of which the following is a specification.

The object of this invention is to prevent the loss of the hub-band from the hub to which it is applied; to avoid the employment of bolts or screws in securing the hub-band to the hub, to avoid the splitting of the hub in securing the hub-band thereto, and to strengthen and protect the hub by the means that are used for holding on the hub-band.

To such end the improvement consists in forming the hub-band and the hub-protector in one solid piece, and making the same in the manner hereinafter fully described, and particularly pointed out in the claim.

Figure 1:
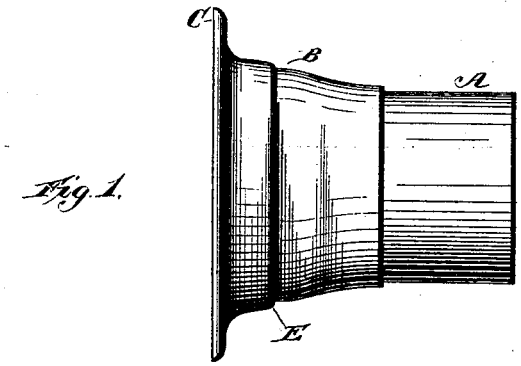
Figure 2:
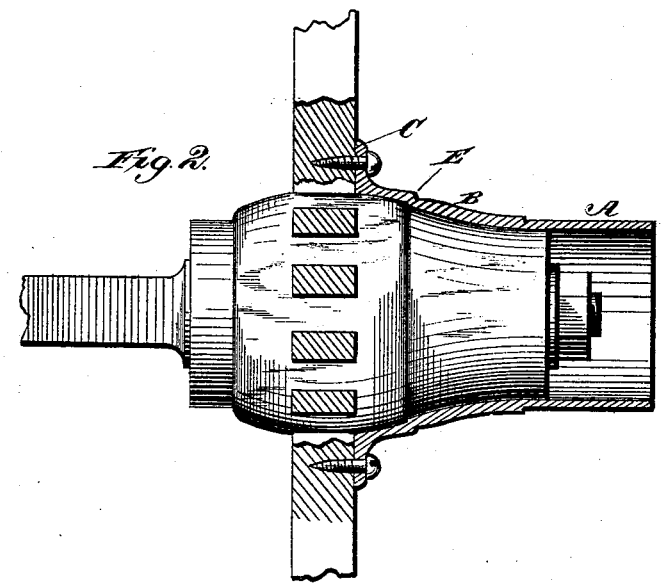
Figure 3:
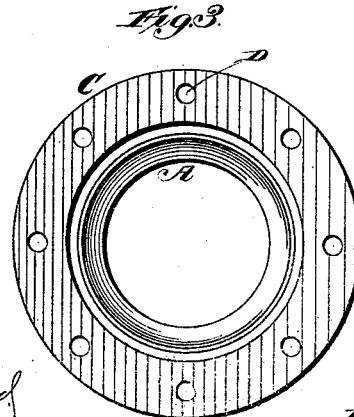

In the drawings, Figure 1 is a side view of the combined hub-band and hub-protector. Fig. 2 is a longitudinal central section through the same, and Fig. 3 is an end view of the flanged end of the device.

Referring to the drawings by letter, A refers to the cylindrical hub-band, which is straight, or nearly so, like the hub-bands in common use, and which, when applied to the hub, will extend out beyond the end of the axle, as usual.

B indicates the hub-protector, that is formed solid with the hub-band. The hub-protector consists of a cylindrical metal shell having its greatest diameter at its inner end, which will be next to the spokes, and it is provided at said end with an annular flange, C, through which are formed the perforations D D for the screws or rivets that will serve to hold the hub-protector in place upon the hub. The hub-protector tapers or decreases in diameter from an annular shoulder, E, to the hub-band, said annular shoulder being formed near the inner or larger end of the hub-protector.

The hub will be made so as to conform externally to the external contour of the hub-protector. The latter will be placed upon the hub and driven home, so that its annular flange will come against the spokes, after which it will be secured in place by means of screws or rivets inserted through the perforations of the annular flange and into the spokes or an annular flange upon the hub.

By casting or forming the flanged hub-protector and the hub-band in one solid piece there can be no danger of the loss or of the displacement of the hub-band, no bolts or screws are required for securing the same to the hub, and hence the hub will not be weakened, and all danger of splitting the same, which heretofore has been a common occurrence, will be avoided. Also, there will be no holes through which water can find its way to the hub.

Having thus described my invention, what I claim is—

As an improved article of manufacture, the metal hub-band A and tapering hub-protector B, formed in one solid piece, the hub-protector being provided with an annular shoulder, E, and an annular perforated flange, C, as shown and described.

In testimony whereof I have hereunto set my hand in the presence of two subscribing witnesses.

CHRISTIAN BOSEKER.

Witnesses:
J. W. KOHR, Jr.,
CHARLES McCULLOCH.